United States Patent [19]

Tidmarsh et al.

[11] 4,284,681

[45] Aug. 18, 1981

[54] COMPOSITE SHEET MATERIAL

[75] Inventors: James N. Tidmarsh, Clifton; Gerald N. Swift, Kingswood, both of England

[73] Assignee: Dycem Limited, Bristol, England

[21] Appl. No.: 52,144

[22] Filed: Jun. 26, 1979

[51] Int. Cl.³ .................... B32B 27/04; B32B 27/06; B32B 27/08

[52] U.S. Cl. .................... 428/246; 428/247; 428/248; 428/251; 428/252; 428/253; 428/286; 428/518; 428/520; 428/522

[58] Field of Search ............... 428/246, 247, 248, 251, 428/252, 253, 286, 518, 520, 522

[56] References Cited

U.S. PATENT DOCUMENTS 4,104,430  8/1978  Fenton .................. 428/520

Primary Examiner—Marion McCamish

Attorney, Agent, or Firm—D. Paul Weaver

[57] ABSTRACT

A composite material comprising a layer of highly-plasticised polyvinylchloride, comprising 15 to 45% of polyvinylchloride and 55 to 85% by weight of a plasticiser, a fibrous backing, and an intermediate layer of a polymeric material between the polyvinylchloride layer and the backing, which material at least reduces the migration of plasticiser from the highly-plasticised polyvinylchloride layer to or through the backing.

This material can be bonded using an adhesive to the walls, floor, and/or ceiling of a room which is to be kept free of dust and/or bacteria, e.g. an operating theatre or computer room. The dust and/or bacteria adhere to the exposed surface of the highly plasticised PVC layer, from which they can be removed by washing. The highly plasticised PVC layer also has valuable anti-slip properties.

9 Claims, 1 Drawing Figure

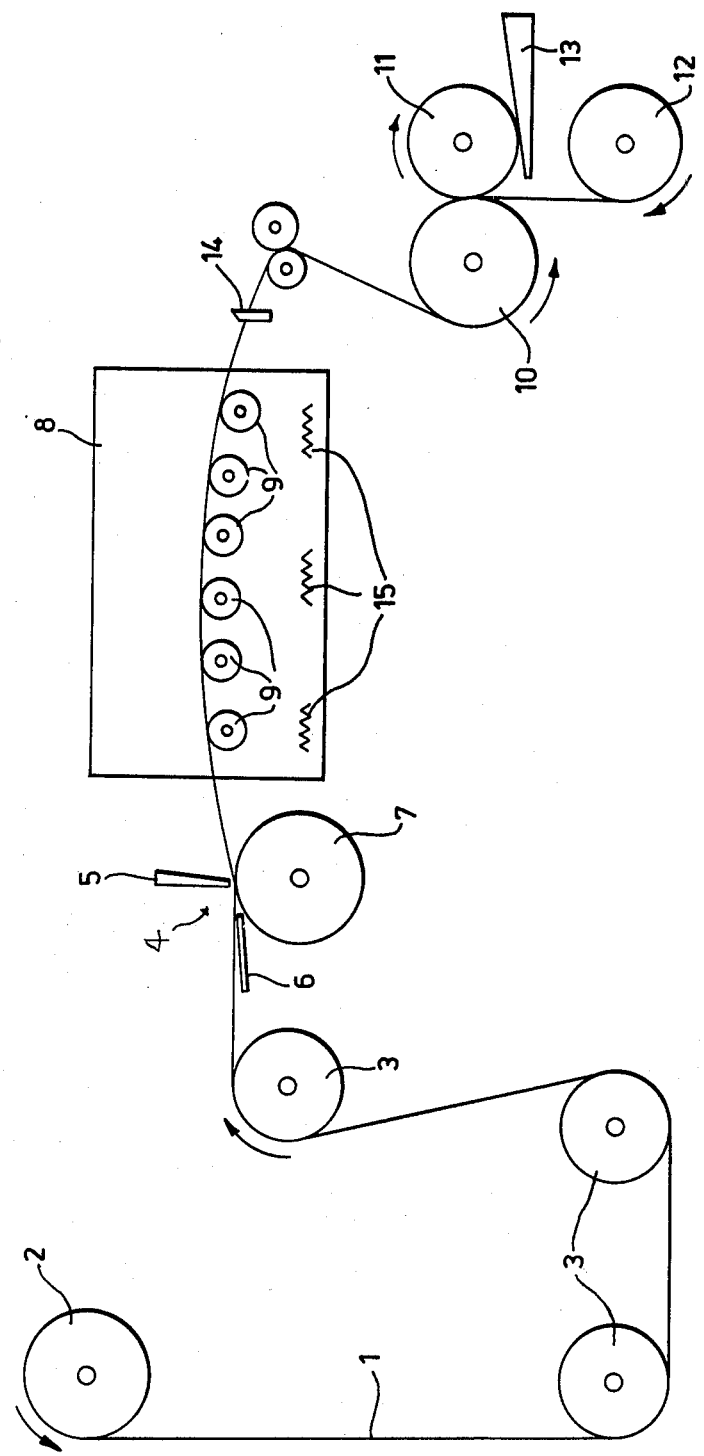

COMPOSITE SHEET MATERIAL

This invention relates to a composite sheet material comprising a layer of highly-plasticised polyvinylchloride (PVC) which has useful non-slip and dust- and-bacteria-collecting properties, and a backing.

Highly plasticised PVC is the subject of our British Pat. No. 1,399,191. Floor coverings, in particular mats, of this material, for the retention of dust and bacteria, are the subject of our British Pat. No. 1,475,366. The usefulness of this material depends to a large extent on the fact that its surface is always coated with a very thin layer of plasticiser, which contributes to the non-slip properties, and is responsible for the dust and bacteria-retaining properties. Although this layer of plasticiser is removed, along with the dirt and bacteria collected, during cleaning, it is quickly replaced by the migration of more plasticiser from the interior of the material to the surface.

However, this material has been found to suffer from certain disadvantages. Firstly, because it is inherently soft and stretchable, it lacks dimensional stability. Secondly, in certain cases the plasticiser can damage substrates (e.g. polished wooden surfaces or plastics flooring) on which mats of the highly-plasticised PVC have been laid. Thirdly, although it would in certain instances be desirable to glue a sheet of this material to a substrate, the presence of the surface layer of plasticiser has until now made this difficult or impossible. Moreover, if this material were bonded to a substrate it could be made thinner, as the substrate would give it additional strength, and also increase the weight per unit area. This would assist the material to lie stably on a flat surface to which it is not glued.

According to this invention we provide a composite material comprising a layer of highly plasticised polyvinylchloride comprising 15% to 45% by weight of polyvinylchloride and 55% to 85% by weight of plasticiser, a fibrous backing, and an intermediate layer of polymeric material between the highly plasticised polyvinylchloride layer and the backing, which material at least reduces the migration of plasticiser from the highly-plasticised polyvinylchloride layer to or through the backing.

We also provide a method of protecting a room or other enclosure from pollution by dust and/or bacteria, by bonding the aforementioned composite material to the floor and/or the ceiling and/or one or more walls of the enclosure using an adhesive.

Thus, if the composite material is laid on a surface with the backing in contact with the surface, the backing protects the surface from damage by the plasticiser. Moreover, a conventional adhesive can be applied to the backing to enable the composite material to be bonded to a substrate, such as a floor or wall. This is particularly useful in environments where the amount of atmospheric dust and/or bacteria should be kept to a minimum, e.g. in hospital operating theatres, computer rooms, the pharmaceutical manufacturing industry and the precision engineering industry.

The intermediate layer must be of a material which can be bonded to both the highly-plasticised PVC and to the backing. One possibility is to use for the intermediate layer PVC containing a lower proportion of plasticiser than is contained in the highly-plasticised layer, and in this case it is not necessary to use the same plasticiser as is used in the highly-plasticised layer. Although such an intermediate layer is fully compatible with the highly-plasticised layer, it may be gradually penetrated by plasticiser from the highly-plasticised layer, especially when the material is exposed to hot environments. Another possible material for the intermediate layer is polyurethane. This is also compatible with the highly plasticised PVC, and is moreover resistant to the plasticiser that are conventionally used to plasticise PVC.

Further possibilities are polychloroprene or modified olefin polymers.

Preferably, the fibrous backing is a knitted, woven, or non-woven sheet of synthetic or natural fibres, for example, cotton, nylon, polyester, or polyolefin, jute or hessian fibres. Particularly suitable materials are spun bonded or melded thermoplastic fibrous materials, a particular advantage of this construction being that the backing may be cut with a hot knife, and welded by fusion techniques.

The plasticiser used in the highly plasticised PVC layer may be any substance conventionally used to plasticise PVC. These are normally considered to fall into two classes, high molecular weight or polymeric plasticisers (of molecular weight about 750 to 1250), and low molecular weight or monomeric plasticisers. Both types are usable, but high molecular weight plasticisers, such as chain-stopped poly(propylene glycol adipate) or poly(1,3-butane diolazelate), are preferred, because of their lower volatility. The highly plasticised PVC preferably contains a modifier of rheological properties, (i.e. a material which makes the plastisol more pseudoplastic and/or thixotropic), preferably finely divided silica such as the commercially-available product Aerosil (Trade Mark). Other possible types of rheological properties modifiers are, for example, those based on bentonite, china clay, hydrogenated caster oil, or aluminum or lithium stearate. When finely divided silica is used, the preferred range is 0.5 to 7 parts by weight, per 100 parts of highly plasticised PVC. The purpose of the rheological properties modifier is to prevent an unacceptable reduction in the viscosity of the highly plasticised PVC when this is heated during manufacture of the composite material.

Various adhesives may be used to stick the composite material to substrates such as walls, ceilings, and floors. If the intermediate layer is not completely impervious to the plasticiser in the highly-plasticised layer, then the adhesive should preferably resist plasticiser migration. An example of a substantially plasticiser-impervious adhesive is an adhesive of the polyurethane type, e.g. "Bostic 2064" (Trade Mark). Examples of other types of adhesives that are usable are the synthetic rubber type (e.g. type F.60 manufactured by F. W. Ball) or adhesives of the acrylic type (e.g. Type F.44 manufactured by F. W. Ball).

The composite material of the invention may be manufactured by first coating a layer of the polymeric material which is to form the intermediate layer onto the backing, then melting the surface of a sheet of highly plasticised PVC and applying the coated surface of the backing to it and then allowing the molten PVC to set. Alternatively, the polymeric coating on the backing may be melted, or both the polymeric coating and the surface of the PVC layer may be melted, before the backing is applied to the PVC layer. An alternative and preferred method of manufacture is to apply the highly plasticised PVC material in paste or plastisol form to a surface of the backing, which has been coated with the polymeric material, and then to gel the highly plasticised PVC in position by the application of heat. In this case the backing would replace the usual carrier used during the casting of sheets of highly plasticised PVC, the usual carrier being release paper, silicone rubber sheet, or PFTE coated glass cloth.

Two non-limiting Examples of composite sheet materials according to the invention are as follows:

|  | Example 1 | Example 2 |
|---|---|---|
| Highly plasticised PVC | 65% Plasticiser-chain-stopped poly (propylene glycol adipate) | 65% Plasticiser-chain-stopped poly (propylene glycol adipate)-average molecular weight: 750 to 1250 |
|  | 35% PVC | 35% PVC |
| Plasticiser - Impervious synthetic polymeric layer | Polyurethane | 37% Plasticiser (dioctyl phthalate-type) 63% PVC |
| Fibrous layer | Woven Nylon Tafetta | Cotton fabric |

The composite material of Example 2 is preferably stuck to a substrate using a polyurethane adhesive, or any other adhesive that resists the plasticisers used in the two PVC-containing layers. The nature of the adhesive to be used for the composite material of Example 1 is less critical, as the polyurethane intermediate layer itself provides a substantially complete barrier to the migration of plasticiser.

One method of manufacturing the composite material is described hereinafter with reference to the accompanying schematic FIGURE.

A continuous web 1 of, for example, a woven cotton fabric, which is to form the backing, is continuously unwound from a supply roller 2. This passes around a series of idler rollers 3 until it reaches a coating station 4 where a polymeric material in paste or plastisol form which is to form the intermediate layer is applied to it. This material is smoothed out to the desired thickness by a doctor blade 5 acting against a supporting plate 6 or the roller 7. The cotton fabric with the layer of polymeric material is then passed through an oven 8. During its passage through the oven the web is supported by a series of support rollers 9 which are so arranged that the web follows a slightly convex path. This is to prevent creasing of the polymeric material as curing progresses. The oven is heated by gas burners 15 located beneath the web. This is important as the turbulence caused by any burners above the web would tend to disturb the layer of highly-fluid hot polymeric material. The polymeric material is cured in the oven and sets. The curing temperature is arranged to suit the polymeric material being applied, and may for example be 190°-200° C. for a polyvinylchloride-based material. After emerging from the oven, the edges of the strip are trimmed, or the strip is cut to width, by blades 14. The web then passes around a driven water-fed cooling roller 10, and is finally taken up on roller 11. A web of release material, to prevent adjacent turns of the coated web from sticking together, is interleaved with the coated web from a supply roller 12. The take-up roller 11 is frictionally driven by the cooling roller 10, and rests against it on an inclined plane 13. It gradually rises up the inclined plane as it fills up and its diameter increases. When it is full is replaced by an empty take-up roller. The only driven roller in the apparatus is the cooling roller 10, all the other rollers are idlers.

The coated web is passed through the same machine (or a similar machine) at least once more in order to apply the highly-plasticised PVC, the number of times depending on the desired thickness of the highly-plasticised PVC layer.

The finished composite material can be bonded using an adhesive to the floor, ceiling, and walls of an enclosure such as an operating theatre or computer room, or pharmaceutical or precision engineering plant. The tacky surface of the highly-plasticised PVC layer retains any dirt or bacteria which come into contact with it. The surface is washed down periodically using a mixture of water and a conventional detergent to remove the surface layer of plasticiser together with the dirt and bacteria adhering to it, and dried. The surface layer is plasticiser is quickly replaced by further plasticiser migrating from within the body of the highly plasticised PVC layer.

The composite material also has valuable non-slip properties and can be stuck to any surface which is to contact another surface, where relative sliding movement between the two surfaces is undesirable.

We claim:

1. A composite material comprising a layer of highly-plasticised polyvinylchloride, comprising 15 to 45% of polyvinylchloride and 55 to 85% by weight of a plasticiser, a fibrous backing, and an intermediate barrier layer of a non-foamed polymeric material between the highly-plasticised polyvinylchloride layer and the backing and bonded to both, which material acts as a barrier to the migration of plasticiser from the highly-plasticised polyvinylchloride layer to or through the backing.

2. A composite material according to claim 1, wherein the highly-plasticised polyvinylcholoride layer contains a modifier of rheological properties.

3. A composite material according to claim 2 wherein as a modifier of rheological properties the highly-plasticised polyvinylchloride layer contains 0.5 to 7 parts by weight of finely divided silica, per 100 parts of highly-plasticised PVC.

4. A composite material according to claim 1, wherein the backing comprises a fibrous material selected from knitted, woven and non-woven, synthetic and natural fibres.

5. A composite material according to claim 4, wherein the backing comprises a material selected from a spun bonded or melded thermoplastics material, or cotton, nylon, jute, hessian, polyester, and polyolefin fibres.

6. A composite material according to claim 1 wherein the intermediate layer comprises a polymeric material selected from polyvinylchloride containing a lower proportion of plasticiser than is contained in the highly-plasticised polyvinylchloride layer, and a polyurethane, polychloroprene, and a modified olefin polymer.

7. A composite material according to claim 1, wherein the plasticiser in the highly-plasticised polyvinylchloride layer has a molecular weight in the range 750–1250.

8. A method of protecting a room or other enclosure from pollution by dust and/or bacteria, by bonding the composite material of claim 1 to one or more surfaces selected from the floor, ceiling and walls of the enclosure, using an adhesive.

9. A composite sheet material comprising bonded together in sequence:
  (1) a top layer of highly-plasticised polyvinylchloride, comprising 15 to 45% by weight of polyvinylchloride and 55 to 85% by weight of a plasticiser, wherein the plasticiser has a molecular weight in the range of about 750 to about 1250;
  (2) an intermediate barrier layer between the highly-plasticised polyvinylchloride layer and the underlying backing layer,
    wherein the intermediate layer consists essentially of a non-foamed polymeric material selected from polyvinylchloride containing a lower proportion of plasticiser than is contained in the highly-plasticised polyvinylchloride layer, a polyurethane, polychloroprene and a modified olefin polymer,
  the intermediate layer providing a barrier to the migration of plasticiser from the highly-plasticised polyvinylchloride layer to or through the backing; and
  (3) a fibrous backing.